US008197336B2

(12) United States Patent
Ellis

(10) Patent No.: US 8,197,336 B2
(45) Date of Patent: Jun. 12, 2012

(54) GAMING APPARATUS AND SYSTEMS

(75) Inventor: Benjamin James Ellis, Wentworthville (AU)

(73) Assignee: Dynamite Games Pty. Ltd., Sydney (AU)

( * ) Notice: Subject to any disclaimer, the term of this patent is extended or adjusted under 35 U.S.C. 154(b) by 61 days.

(21) Appl. No.: 12/451,199

(22) PCT Filed: Apr. 28, 2008

(86) PCT No.: PCT/AU2008/000586

§ 371 (c)(1),
(2), (4) Date: Feb. 4, 2010

(87) PCT Pub. No.: WO2008/134794

PCT Pub. Date: Nov. 13, 2008

(65) Prior Publication Data

US 2010/0137061 A1 Jun. 3, 2010

(30) Foreign Application Priority Data

May 2, 2007 (AU) ................................ 2007902310

(51) Int. Cl.
*G06F 17/00* (2006.01)

(52) U.S. Cl. ........................................................ 463/26

(58) Field of Classification Search .............. 463/16–26, 463/42

See application file for complete search history.

(56) References Cited

U.S. PATENT DOCUMENTS

| | | | | |
|---|---|---|---|---|
| 6,371,852 | B1 | 4/2002 | Acres | |
| 6,604,999 | B2 | 8/2003 | Ainsworth | |
| 7,029,396 | B2 | 4/2006 | Jaffe et al. | |
| 7,883,410 | B2 * | 2/2011 | Soukup et al. | 463/27 |
| 7,892,093 | B2 * | 2/2011 | Kniesteadt et al. | 463/25 |
| 7,963,843 | B2 * | 6/2011 | Martin et al. | 463/25 |
| 7,963,845 | B2 * | 6/2011 | Baerlocher | 463/25 |
| 7,963,847 | B2 * | 6/2011 | Baerlocher | 463/27 |
| 2005/0059480 | A1 | 3/2005 | Soukup et al. | |
| 2006/0135253 | A1 | 6/2006 | George et al. | |
| 2007/0129134 | A1 | 6/2007 | Barrie | |

FOREIGN PATENT DOCUMENTS

| | | | |
|---|---|---|---|
| WO | WO-01/28646 | A1 | 4/2001 |
| WO | WO-02/054331 | A2 | 7/2002 |
| WO | WO-2005/027063 | A1 | 3/2005 |
| WO | WO-2008/134495 | A1 | 11/2008 |

* cited by examiner

*Primary Examiner* — Ronald Laneau

(74) *Attorney, Agent, or Firm* — Venable LLP; Henry J. Daley

(57) ABSTRACT

Gaming apparatus (1), e.g. an Electronic Gaming Machine (EGM), includes a controller (2) for implementing e.g. a slot-machine game, casino game or the like. The controller (2) displays a suitable gaming image on a screen (6), e.g. virtual symbol reels or card hands, and a player interacts with the EGM 1 through buttons (8) or the like, e.g. to spin the reels or deal cards. The apparatus includes award means for awarding a player event points during the course of play, accumulator means for accumulating the awarded event points, and purchasing/selection means for allowing a player to purchase a game event using the accumulated event points. These game events may provide the player with the chance of higher returns or the like, and may include free plays, high return games, a jackpot game and the like.

16 Claims, 3 Drawing Sheets

GAMING APPARATUS AND SYSTEMS

The present invention relates to gaming apparatus and systems. It relates for example to electronic gaming machines and to networked gaming systems. It relates for example to Intranet and/or Internet-based gaming systems.

Gaming machines have been a popular form of entertainment for many years. This popularity has been enhanced with the advent of electronic gaming machines and also computer-based gaming systems, such as are provided over the Internet.

Many different types of game are playable. They include for example standard slot-machine type games, with spinning reels, and casino-type games. They include games such as poker, keno, bingo, blackjack, roulette, pachinko, Sic Bo and many others.

A user will typically place a bet, press a button or pull a lever to begin a game, and will win or lose based upon for example mechanical reel stops and/or a gaming machine's play algorithms and random number generators.

An aim of the present invention is to provide gaming apparatus and systems having novel features that may enhance gameplay.

Viewed from one aspect, the present invention provides gaming apparatus including:

game means for playing a game, including means for placing a bet on a game and for determining a win outcome based on the playing of a game;

award means for awarding a player event points during the course of play;

accumulator means for accumulating awarded event points; and purchasing means for allowing a user to purchase a game event using accumulated event points.

A game event may be any event associated with the play of a game. It may be a prize event, e.g. the winning of money or play credits or some other prize, or could be a feature event, e.g. an event that provides some sort of advantage or interest to a player.

For example, a prize event could be the immediate winning of a fixed amount of money or play credits or of a variable or random amount of money or credits.

A bonus or feature event could relate to a free game or a respin. It could also relate to the changing of a game's parameters so as to provide for higher average returns. For example, it could relate to the provision of better odds, e.g. through a change in the frequency of appearance of symbols, and/or it could relate to higher winnings for a prize event or to the multiplication of any winnings by a set amount. The bonus or feature could be the appearance of a particularly valuable symbol or the like, e.g. a "wildcard" symbol that may take the value of any other symbol, e.g. in a slot reel or in a card hand.

The bonus event could be related to the basic or main game, or could relate to a bonus game or the like, e.g. a "second screen" type game that is extraneous to a main or basic game. This bonus game may provide higher payouts and the like or the chance to win further bonuses. The bonus or feature could be e.g. a luck or skills-based feature. It could be a bonus screen of the main game or a special bonus screen only available through a user purchase using event points.

The present invention provides a way of increasing a user's interest in a game. It may provide a player with a degree of control over how a game is played, and allows a player to accumulate points until the player decides that they wish to dispose of the points and obtain an appropriately valuable game event, which they may then use to improve their winnings or winnings potential. It allows a player to decide when in the course of a game to initiate a game event.

Games are known in which a player triggers a feature if they achieve a certain goal, but this neither allows a player to decide when to activate a feature nor allows a player to decide which feature to activate. In contrast, the present invention allows a player to accumulate points and then to decide how best to spend those points, e.g. when and on what.

The game event could be a mystery or random event, e.g. a mystery win amount or a mystery bonus event or the like, or a randomly selected event. This would allow a player to gamble event points for the chance to win a prize or bonus event of greater value than they could otherwise afford.

The game event could relate to a jackpot, and e.g. could provide the chance of winning a jackpot amount, e.g. it could provide a jackpot spin. The jackpot could be a fixed or progressive jackpot, and could be a linked jackpot, i.e. a jackpot that is played for by a number of networked machines.

The various possible game events may be ranked according to worth, with more valuable game events costing more event points to purchase.

A purchased game event could exist for a single play of a game or could be provided over a number of plays, in which case it may be accordingly more expensive to purchase.

In one embodiment, a player may purchase a number of events to run concurrently, so long as the player has sufficient points, and events may be combined, so that for example a "tripling of winnings" game event may be combined with an "Improved Odds" game event. In such cases, a premium charge may be applied when game events are combined, so that the events cost more to purchase together than separately, e.g. they may cost double their combined individual points. This may take account of any higher payout rate expected from such combinations.

When some game events are purchased, the gaming apparatus may automatically set play parameters in the played game, so as to ensure that the game is mathematically viable and consistent with the event purchasing feature.

For example, in order to have certain options available for purchase, the apparatus may set a fixed betting structure, such as a fixed $1 bet per standard play of a game. This may prevent a player from accumulating valuable event points through cheap gameplay and then dramatically increasing their bets when they purchase bonus features.

As well as purchasing game events, the apparatus may include means for allowing a player may cash in their points, e.g. for cash or for play credits. This may for example allow a player to end a play session without losing their accumulated points.

The apparatus may include means for monitoring gameplay and the award means may award event points to a player based on the monitored gameplay, e.g. based on an amount of gameplay and/or on gameplay history.

Gameplay may relate for example to the number of bets laid or to the amount of bets laid, e.g. during a set period or in total. It could also relate to the number of plays of a game or rates of play, e.g. the number of reels of a slot machine or the number of hands of poker played or the number of lines of a slot machine played. It may also relate to any other parameter indicative of an amount of gameplay, e.g. the time period during which play has actually occurred.

Gameplay could also relate to a particular game outcome. For example, event points may be awarded when specific win events occur that relate to the award of event points, e.g. when specific symbols or combinations or arrangements of symbols occur in the play of a game. A player may then not only play for normal cash wins, but may also play for event points, e.g. if they know that they only need a few more points for the ability to purchase a particularly significant game event.

Event points could also be won in feature or bonus games, which e.g. could occur in a separate screen.

If a player plays in a linked game with other machines, then event points may also be awarded based on the gameplay on other machines. For example, the triggering of a jackpot by one person may provide everyone playing the linked game with event points.

Event points may also be awarded in other circumstances, e.g. as a consolation when a player does not achieve a win or achieves only small wins over a number of plays. In one embodiment, event points may be awarded in a random manner, e.g. points may be awarded at random times or a decision on whether to award points or not may be determined randomly. It would also be possible to randomly determine the amount of points awarded.

Event points may be awarded by a management, loyalty, membership or other system. For example, event points may be awarded to new club members on joining a club.

The award means may allow a player to purchase event points, e.g. with cash or play credits. A limit may be placed on the amount of event points that may be obtained in this manner, e.g. as a percentage of the normally accumulated event points.

The award means may also subtract event points, so that a player may lose event points. Losses could occur under similar circumstances to the receiving of event points, e.g. when a set combination of symbols occur or the like. In a linked game, a player could lose event points to another player, so that e.g. if one player triggers a specific event, they may receive event points from other players.

The ability to accumulate event points and purchase game events may be automatically provided or may require eligibility. Thus, in the latter case, a player may need to buy or win the ability to accumulate event points. This may be by placing a fixed or variable side bet.

In one preferred embodiment, the gaming apparatus includes storage means for storing accumulated points, e.g. at the end of a play session, so that when a player stops playing a game, the event points are not lost, and when the player returns to play a game at a later time, the accumulated points continue. The storage means may also allow a player to transfer their accumulated event points between gaming machines.

For example, in one embodiment, player terminals are linked to a central control that monitors play on each terminal. In this case, the event points may be stored centrally at the central control, and the player may move between terminals in the system or may stop and return later without a loss of accumulated event points. In another embodiment, the apparatus may include a data storage device, e.g. a player data or identity card or other individual storage device or the like on which information may be stored, such as event points, so that when a player uses the device to access a gaming machine and e.g. to place bets, the device may also inform the machine or system of a player's accumulated event points.

The awarding of event points and the purchasing of game events may be used with standard activation of bonus features during normal gameplay, so that the awarding of event points may be an add-on to a game rather than the only means by which a player may trigger features.

The present invention may be applied to gaming apparatus that plays any suitable game or games, e.g. slot-machine-type games or casino-type games. The present invention could relate to poker, keno, blackjack, bingo, roulette, Sic-Bo, pachinko, and many other betting games.

The present invention may be applied to any suitable type of gaming system or platform. It can apply to stand-alone gaming apparatus, e.g. electronic gaming machines, such as video gaming machines, e.g. video slot machines and to gaming devices that are linked together, e.g. electronic gaming machines that are linked via a network such as an intranet. It may apply to gaming systems provided through computing or other electronic devices, e.g. personal computers, PDAs, mobile telephones, digital televisions and the like, e.g. provided over the Internet or other communications networks.

The present invention may be applied to gaming apparatus that is mechanical in nature, e.g. spinning reels, and which includes electronic means for supplementing and/or reflecting the mechanical game play, or an electronic management system. For example, the present invention may be applied to a mechanical "stepper" slot game that is coupled with an overhead video screen that may display the mechanical reels and/or may provide extra functionality, e.g. feature games, linked jackpots, and the like.

When part of a network, a particular gaming device may receive event points based only on gameplay on that device, or may receive event points based on gameplay on other linked devices as well, e.g. all of the devices that are taking part in a particular linked game might receive bonus event points based on a particular event, e.g. a jackpot win by one of the players.

In networked games, the apparatus may include a central control/server for conducting games and for managing the accounting and the like, and a number of remote terminals/clients that provide user input and display mechanisms. The control of the game may be carried out at the central control or at the remote control or may be split between the two.

The present invention extends to central controls/servers and remote terminals/clients that are configured to carry out event buying features of the present invention.

Viewed from another aspect, the present invention provides a gaming system including:

means for playing a game and for placing a bet on the game;

means for awarding a player event points over the course of a playing session;

accumulator means for accumulating awarded event points; and purchasing means for allowing a player to purchase a game event using accumulated event points.

The system may include a central control for running a gaming algorithm, and a plurality of remote clients in communication with the central control over a communications network. The remote clients may include means for displaying gaming screens and for allowing player interaction with the central control. The system may store player event points between play sessions, e.g. on the central control or on a player data storage device, e.g. a card, for storing event points between sessions.

Viewed from another aspect, the present invention provides a method of operating gaming apparatus, the method including the steps of:

running a game on the apparatus and taking bets on the game;

awarding a player event points; and allowing a player to purchase a game event from a selection of possible game events using awarded event points.

Viewed from a further aspect, the present invention provides gaming software including:

a component for playing a game and for placing a bet on the game;

a component for awarding a player event points over the course of a number of plays of a game; and a component for allowing a player to purchase a game event using awarded event points.

The present invention also extends to gaming/computer software products, including a data storage medium on which gaming software/program code according to the present invention is stored.

Viewed from a still further aspect, the present invention provides gaming apparatus including: a gaming device, e.g. a software engine and/or mechanical apparatus, for running a game and receiving bets; a gameplay monitor for monitoring user gameplay; an accumulator for accumulating event points based on monitored gameplay; and a game event selector for allowing a player to purchase a game event using accumulated event points.

Viewed from another aspect, the present invention provides an electronic game in which a bet is placed, game events occur and wins are returned, wherein gameplay is monitored, wherein a player accumulates event points based on gameplay, and wherein a player can purchase game events using accumulated event points.

It should be noted that any one of the aspects mentioned above may include any of the features of any of the other aspects mentioned above and may include any of the features of any of the embodiments described below, as appropriate.

Embodiments of the present invention will now be described, by way of example only, with reference to the accompanying drawings. It is to be understood that the particularity of the drawings does not supersede the generality of the preceding description of the invention.

Figure 1:
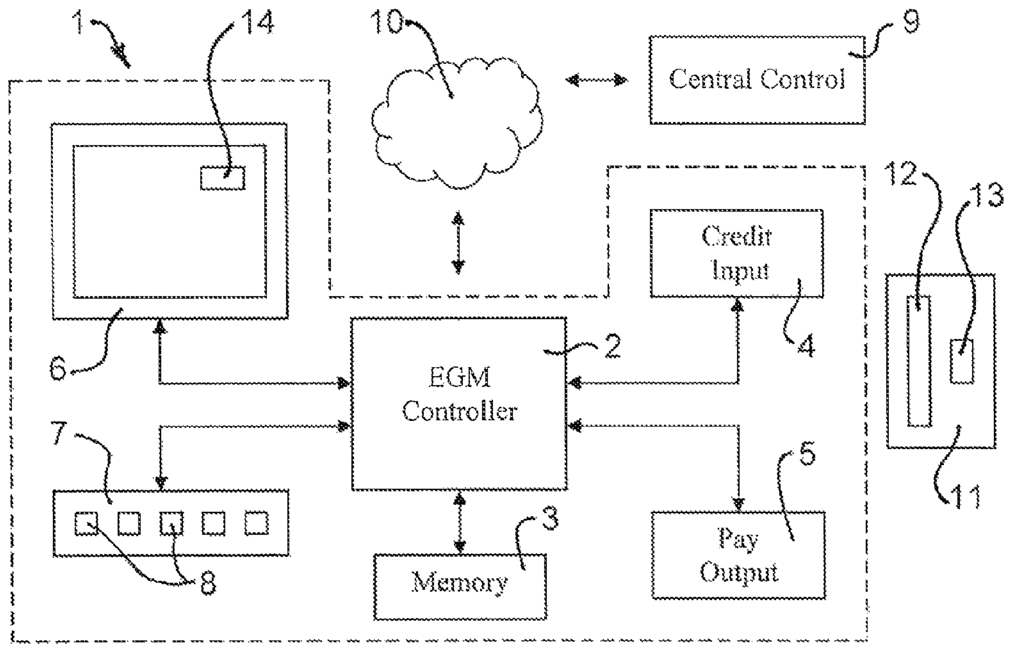
FIG. 1 is a block diagram of gaming apparatus according to an embodiment of the present invention.

Referring to FIG. 1, gaming apparatus, which in this case takes the form of an electronic gaming machine (EGM) 1, includes various components, such as a controller 2 for controlling the operation of the EGM 1 and the games run on it, memory 3 for storing programs and data used by the controller 2, a credit input 4 for receiving monies, e.g. coins, tokens and/or electronic credits, e.g. stored on a data storage card, a win output 5 for paying out winnings, e.g. as coins, tokens or electronic money, e.g. by updating a card, a display 6 for displaying game screens, and user inputs 7 for allowing user interactions. The user inputs 7 may include buttons 8, which may be provided as part of a touchscreen of the display 6 or may be separate physical buttons.

The EGM 1 may be a stand-alone machine. It may also be networked with other EGMs and/or a control centre 9 via a suitable communications network 10, such as a LAN and/or WAN. This may for example allow for the play of networked (e.g. intranet or Internet) games, such as a linked jackpot.

In use, the EGM 1 displays an initial gaming screen on the display 6. A player inserts coins and/or tokens into the credit input 4, and presses a button 8 to initiate play. How matters then proceed will depend on the type of game being played. For example, in a slot machine-type game, the EGM 1 will display virtual reels of symbols, and will spin and stop these reels in various win and lose symbol combinations on a pay line in accordance with stored gaming algorithms and random number generators. Alternatively, in a card-type game, a player will manage cards, e.g. receive a number of cards with which to play for a winning hand.

The player may interact via the display 6 and user inputs 7, so as to spin or hold reels, or to obtain and throw away cards and the like.

A player may have an electronic device 11, e.g. in the form of a card, that allows them to play the machine 1. The game card 11 may be an identity card that stores the player's identity, e.g. on a magnetic strip 12 or chip 13, and the player may use the card to access an account held on a central control 9 that the EGM 1 communicates with through the network 10. The player can then pay for bets and receive winning at the central control 9. Alternatively, the card 11 may itself store credits for betting and win amounts, e.g. in the chip 13. In this case, an appropriate card terminal may be provided to top-up the card by buying credits and to cash in recorded wins for actual prizes or money.

Whatever game is played, a common element will be win events, e.g. the pay out of a prize when a particular symbol or card combination occurs.

Also, in order to increase interest, a game will often include bonus or feature events that may or may not relate directly to the game being played, and that generally provide an advantage of some sort. These bonus or features events may include for example one or more free games, a respin (similar to a free game but with one or more reels held), or the chance to play for higher returns, e.g. higher payouts, better odds or the like. The bonus feature may relate to a wild feature, such as a wild reel symbol or card that can represent more than one type of symbol or card, and so can increase the chances of achieving a winning combination or the like. The bonus features may be provided in the main game or as "second screen" features that display on a new screen. Bonus features are generally luck-based, but could be skills-based. They could for example allow a player to purchase an extra wild card in a draw poker skill game.

These win and feature events can be arranged to occur in many different ways, e.g. randomly, or under a particular set of circumstances, e.g. based on a play outcome, e.g. triggered by a set reel symbol or card combination.

In accordance with an embodiment of the present invention, the controller 2 awards a player event points during the course of playing the machine 1, and allows a player to select one or more game events using the event points that they accumulate. Thus, the EGM 1 includes an award means for awarding a player event points, an accumulator means for storing the event points awarded, e.g. in the memory 3, and a purchasing/selection means for allowing a user to select and purchase a game event using the accumulated event points. These means may be provided through the EGM controller 2 and memory 3 and/or through the central control 9.

The EGM 1 may display the number of accumulated points in a box 14 on the display 6, and may include a button or buttons 8 that allow the player to select a game event or to be taken to a screen that allows for the selection of a game event using the event points.

The game event may be any event of value or interest to a player, e.g. any type of bonus, feature or prize event, e.g. of the types discussed above. It may for example be the occurrence of a valuable symbol, such as a wild symbol or card, or may relate to the changing of a game's parameters to provide a higher return, e.g. through better odds or through an increase in amounts won. It could also be a free game, respin or the actuation of a feature game that provides one or more of these advantages. It may provide the chance to play for a jackpot, e.g. a jackpot spin. It may provide a mystery win or a random game event, so that the player may gamble on receiving a more valuable game event than they can purchase directly. A prize event may be e.g. the winning of a fixed or variable prize.

Once a player has purchased a game event, it may last for only a single play or may remain for a number of game plays, the latter situation requiring more event points than the former.

A user may purchase more than one game event at the same time, assuming that they have sufficient funds to do so, and these game events may run concurrently. Where game events are run concurrently, the user may have to pay more event points for the combination than for the two individual events, as the concurrent events may generate a higher rate of return than a pair of single events.

The ability to purchase game events using accumulated event points provide for greater interest in the game and for more involved gameplay, in which the player is given greater control of their play. They may choose the timing of game events and the type of game events to play. With the game events, a player may obtain an advantage in their play, and so may receive higher returns on their bets.

A player may be awarded event points based on their gameplay. For example, the controller 2 may provide gameplay monitoring means to monitor the bets laid by a player. It may then award event points based on the amount bet or on the number or type of bets laid, or on the number of games or pay lines played and the like. It may also award points based on the outcome of a game, e.g. an award of event points may be triggered when a particular combination of symbols occurs on the display 6.

Event points could also be allocated randomly, e.g. awards could be made at random times, a decision on whether or not to award points could be made randomly, and/or the amount of an award could be random.

Event points could also be lost, e.g. through the triggering of a loss event by the wheels. Further, event points could be bought by a player, although there may be some limit as to the number of points that can be purchased, e.g. a percentage of the accumulated points.

Event points may be awarded by a management, loyalty, membership or other system. For example, event points may be awarded through the central control 9 to club members as a joining bonus or in some other manner.

In a linked game, it may be possible for a player to lose event points to another player, so that e.g. if one player triggers a specific event, they may receive event points from other players.

Although the event points feature may be automatically provided by the gaming machine 1, it would also be possible to require a user to pay money for the ability to accumulate points or to win this ability. For example, a player may be required to place a fixed or variable side bet in order to accumulate points.

When a player finishes a play session, the EGM 1 may allow the player to cash in their accumulated event points, e.g. for cash or play credits. The EGM 1 may also allow a player to store their event points for a later play session. The event points may for example be recorded in storage means in the EGM 1 or in the central control 9, or may be stored in a player's game card 11.

The apparatus may include means for fixing or limiting the play parameters of the basic game, so as to ensure that the game is mathematically viable and consistent with the event purchasing feature. For example, in order to have certain options available for selection, the apparatus 1 may set a fixed betting structure, such as a fixed $1 bet per play of a game.

Figure 2:
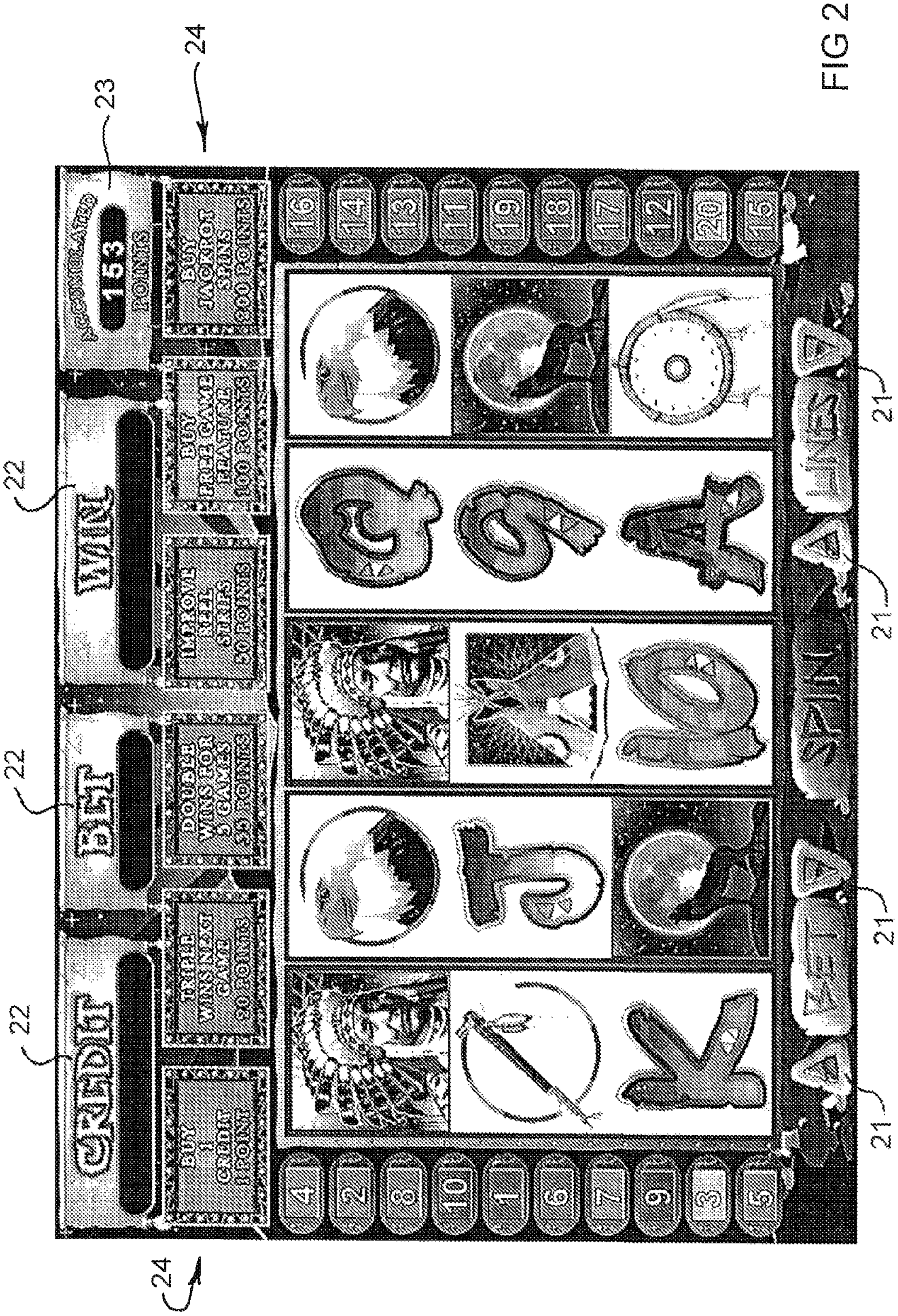
FIG. 2 is a screen shot of a gaming machine's display, showing event point accumulation and game event selection features according to an embodiment of the present invention.

FIG. 2 is a screen shot of the display 6 showing one way of implementing the game point accumulation and game event selection. The screen shot shows a number of virtual gaming reels 20 that are spun to provide symbol combinations in accordance with the rules of the gaming algorithms run by the controller 2 and its random number generators. It also shows touchscreen buttons 21 that allow a user to place a bet, to choose the number of pay lines to play (numbered along the left and right sides of the reels 20), and to set the reels 20 spinning. It further shows indicator boxes 22 for indicating a player's remaining credits, the bets laid and a player's accumulated winnings.

In the top right-hand corner of the display 6, the screen further includes an accumulator display 23 that indicates the number of event points that a player has accumulated. Also, along the top of the reels 20, the display 6 includes a plurality of game event selection buttons 24 that allow a user to purchase one or more game events for the displayed number of event points associated with each button.

In the example shown, the game events and associated event point costs are:

Buy a Credit—One Point
Triple Wins Next Game—20 Points
Double Wins for 5 Games—35 Points
Improve Reel Strips—50 Points
Buy Free Game Feature—100 Points
Buy Jackpot Spins—200 Points These game events are self-explanatory in the main. The improvement of reel strips increases the average Return to Player on a given game (e.g. from 90% to 150%) by changing the reel parameters, e.g. the odds of specific symbol combinations occurring. The free game feature could in this instance buy a pre-determined (disclosed in the game rules or undisclosed) or random free game feature (e.g. the award of ten free games, with or without prize multiplication). The jackpot spins could allow a player to spin for the possibility of winning a jackpot. This could be a fixed or progressive jackpot and could be a linked jackpot if the EGM 1 is linked with other machines.

Other types of game event could also be purchased, e.g. a mystery event or random event, extra wild symbols or the like.

There may also be a "cash-out" button that provides a cash payout for the accumulated points, should a player wish to end their play session. Alternatively or also, the player's points could be stored for a later play session, e.g. on a central control 9 with which the EGM 1 connects or on a player's game card, e.g. card 11 as shown in FIG. 1.

A player may be limited to only purchasing one game event at a time, or could have multiple game events running concurrently. In the latter case, the display may indicate that a further amount of event points are needed as a premium payment, in view of the higher returns possible through the combination.

The accumulation and game event purchasing features may appear on the screen automatically and always be played, or may only be played if a player elects to have the ability to purchase game events, e.g. by paying a suitable number of credits.

Instead of the selection buttons 24, the display 6 could show a single button for purchasing event points, which could then take the player to a selection screen, where events may be selected and required event points totalled.

The apparatus may select and display only those game events for which the player have sufficient event points to purchase, or could show various possible game events that may be purchased, irrespective of a player's current accumulated events points total.

Figure 3:
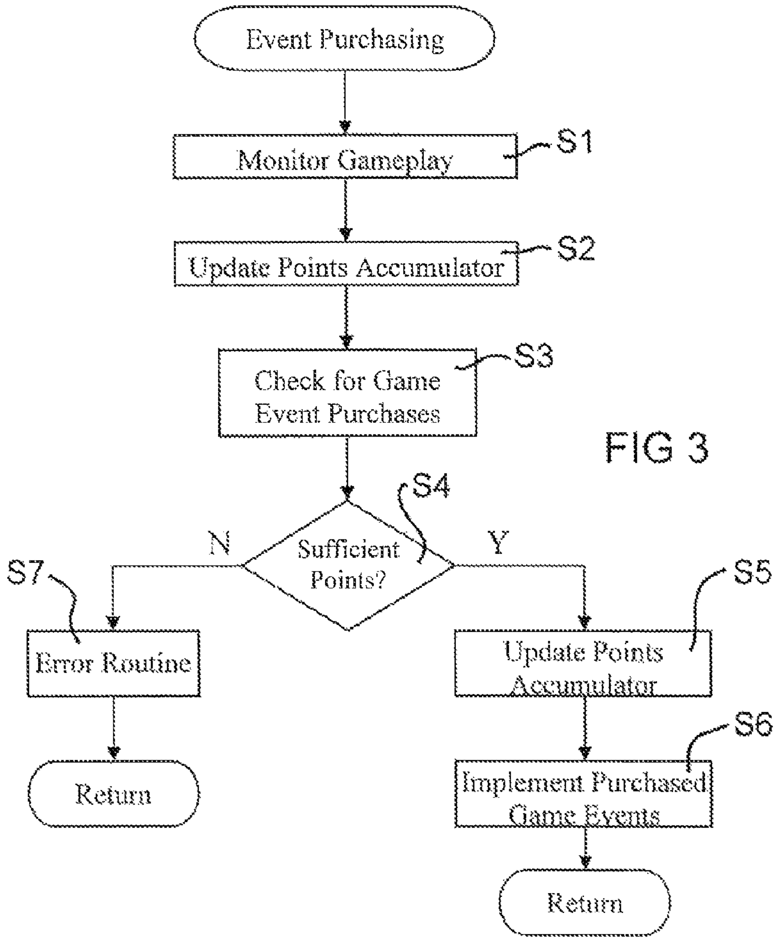
FIG. 3 is a flow diagram of a control process in accordance with an embodiment of the present invention.

FIG. 3 shows one possible flowchart for the running of a game event purchasing feature by the controller 2. Thus, an embodiment of the invention may be put into effect by the controller 2 running software that incorporates a subroutine executing in the manner shown.

At step S1, the controller 2 monitors gameplay to determine user interaction and game results. At step S2, the controller 2 awards points to a player based on the monitored gameplay and updates an accumulator, e.g. in the memory 3, with the new points. This may then be displayed in the accumulator box 22 on the display 6.

At step S3, the controller 2 checks for a user purchase, e.g. through the selection of one of the buttons 24 on the screen of FIG. 2. If a user is found to have sufficient points for the selection at step S4, the points are deducted from the accumulator at step S5, and the game feature or features purchased are implemented at step S6. If the player has selected a game event or events for which the player does not have sufficient points, the process branches at step S4 to an error routine at step S7 in which e.g. the user is asked to choose again or possibly asked to purchase the necessary top-up using play credits.

The above is of course only one possible routine and other steps and routines may be utilised as well.

Figure 4:
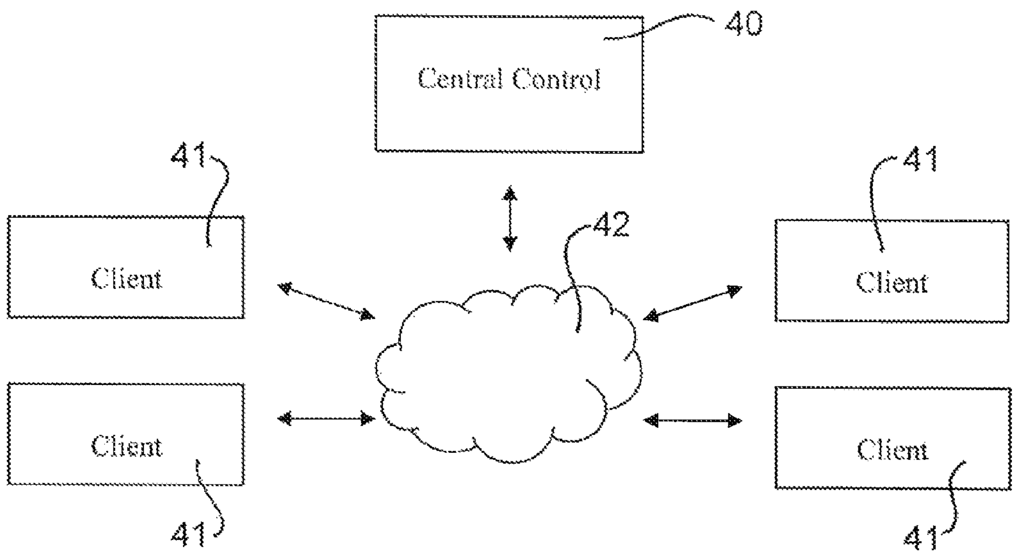
FIG. 4 is a schematic diagram of further apparatus for implementing an embodiment of the present invention.

FIG. 4 is a schematic diagram of further apparatus for carrying out an embodiment of the present invention, in which there is a central control/server 40 that communicates with a number of remote player terminals/client programs 41, e.g. computing devices, through a suitable communications medium 42. The computing devices 41 could for example be personal computers, PDAs, mobile phones, digital televisions, or the like, and the communications medium 42 could be for example the Internet, an intranet, a telephone or television communications system, e.g. satellite or cable, or any other suitable communications network.

In this embodiment, the running of a game and the determining of bet outcomes and the like, including the accumulation of event points and the purchasing of game events, can occur on the central control 40, whilst user inputs and the display of games screens and the like occur on the player terminals 41. The terminals 41 may receive program code or other data from the central control 40 in order to provide an appropriate user interface.

Figure 5:
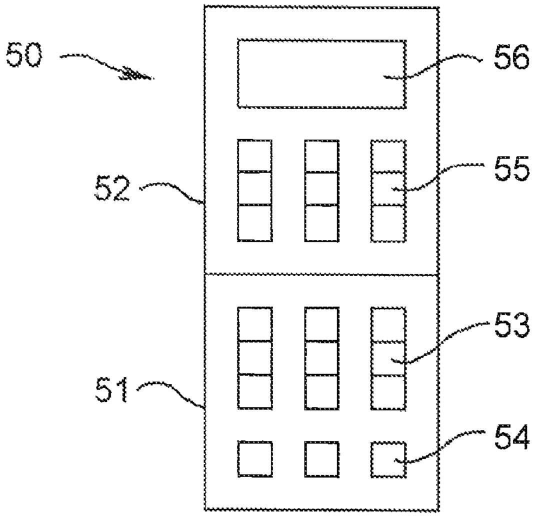
FIG. 5 is a schematic diagram of further apparatus for implementing an embodiment of the present invention.

FIG. 5 shows further apparatus that could implement an embodiment of the present invention, in which an electronic gaming machine 50 includes a mechanical part 51 and an associated electronic control and display 52. The mechanical part 51 includes a set of mechanical reels 53 and player buttons 54, with the reels 53 being spun and stopped to provide prizes and features based on the resulting reel symbols. The electronic control 52 may display the results of the reels 53, e.g. as screen reels 55, and may also oversee any feature functions and the like associated with the game, such as a series betting feature, through further display area 56.

Various modifications may be made to the embodiments described above. For example, as said, instead of the selection buttons 24 of FIG. 2, there could be a single selection button that takes the player to a separate screen where they may then choose a gaming feature or features from a list of features.

Also, a button may be provided to allow a player to purchase event points using game credits. This ability may be capped to a suitable number of points or to a percentage of the non-purchased points.

Points could also be lost, e.g. should a particular set of symbols appear on the reels.

The game event purchasing and points accumulation may also be applied to many other games, besides reels. For example, it could be applied to poker, keno, bingo, blackjack, roulette, pachinko, Sic Bo and to many other games, including many types of casino games.

As can be seen, the gaming apparatus may take many different forms, including an EGM and/or computing network. It could for example comprise a game provided on a computing or other electronic device, such as on a personal computer, PDA, mobile phone, digital television or the like. The game may be provided over an intranet, the Internet, or some other communications system, such as a mobile telephone system.

It is to be understood that various alterations, additions and/or modifications may be made to the parts previously described without departing from the ambit of the present invention, and that, in the light of the above teachings, the present invention may be implemented in mechanical elements, in software, in firmware and/or in hardware in a variety of manners as would be understood by the skilled person.

The invention claimed is:

1. Gaming apparatus, comprising:

a game controller for controlling play of a wager game, the game controller being arranged to award a player event points during the course of play and store accumulated event points awarded to the player, the game controller being further arranged to allow a user to purchase a selected one or more game modifiers from a plurality of selectable game modifiers using the accumulated event points, each selected game modifier being operable to modify a parameter of the game so as to increase a return to player percentage of the game for at least one subsequent play thereof and wherein at least one of the plurality of selectable game modifiers is operable to modify a different game play parameter to another one of the game modifiers.

2. The apparatus of claim 1, wherein the game controller is further arranged to monitor gameplay, and wherein event points are awarded based on monitored gameplay.

3. The apparatus of claim 2, wherein said gameplay includes at least one of amount of bets laid, total games played, a predefined game result, and the winning of a game feature.

4. The apparatus of claim 1, wherein event points are rewarded to a player randomly.

5. The apparatus of claim 1, wherein the controller is further arranged to allow a player to purchase the event points.

6. The apparatus of claim 1, wherein at least one of said selectable game modifiers is operable to adjust a number and/or type of symbols selectable in the game to improve the return to player percentage.

7. The apparatus of claim 1, wherein at least one of said selectable game modifiers is operable to modify a payable for the game.

8. The apparatus of claim 1, wherein each of said plurality of selectable game modifiers is allocated a preset number of event points.

9. The apparatus of claim 1, wherein said game controller allows the player to purchase game events to run concurrently.

10. The apparatus of claim 1, further comprising a storage device for storing the player's accumulated event points for use in a later playing session.

11. The apparatus of claim 10, wherein said storage device is provided by a player card and/or by a remote central control with which said apparatus communicates.

12. The apparatus of claim 1, wherein the apparatus is an electronic gaming machine.

13. The apparatus of claim 1, wherein the apparatus includes a central control and a plurality of remote devices in communication with the central control, the game controller being operable to award a player event points dependent on gameplay on a plurality of said devices.

14. A method of operating gaming apparatus, comprising:

running a game on said apparatus and receiving bets relating to said game;

awarding a player event points; and allowing a player to purchase a selected one or more game modifiers from a selection of possible game modifiers using awarded points, each selected game modifier operable to modify a parameter of the game so as to increase a return to player percentage of the game for at least one subsequent play thereof and wherein at least one of the possible modifiers is operable to modify a different game play parameter to another one of the possible game modifiers.

15. A non-transitory computer readable medium encoded gaming software comprising:

a component for playing a game and for placing a bet on the game;

a component for awarding a player event points over the course of a number of plays of a game; and a component for allowing a player to purchase one or more selected game modifiers from a plurality of selectable game modifiers using awarded event points, each selected game modifier operable to modify a parameter of the game so as to increase a return to player percentage of the game for at least one subsequent play thereof and wherein at least one of the plurality of selectable game modifiers is operable to modify a different game play parameter to another one of the game modifiers.

16. Gaming apparatus comprising:

a gameplay monitor for monitoring user gameplay;

an accumulator for accumulating event points based on monitored gameplay; and a game modifier selector for allowing a player to purchase a selected game modifier from a plurality of selectable game modifiers using said event points, the selected game modifier operable to modify a parameter of the game so as to increase a return to player percentage of the game for at least one subsequent play thereof and wherein at least one of the plurality of selectable game modifiers is operable to modify a different game play parameter to another one of the game modifiers.

* * * * *